United States Patent
Becquet et al.

(10) Patent No.: US 10,125,256 B2
(45) Date of Patent: Nov. 13, 2018

(54) COMPOSITION FOR FRICTION MATERIAL

(71) Applicant: Akebono Brake Industry, Co., Ltd., Tokyo (JP)

(72) Inventors: Anne-Laure Becquet, Tokyo (JP); Wataru Shindo, Tokyo (JP)

(73) Assignee: Akebono Brake Industry, Co., Ltd., Tokyo (JP)

( * ) Notice: Subject to any disclaimer, the term of this patent is extended or adjusted under 35 U.S.C. 154(b) by 122 days.

(21) Appl. No.: 15/132,708

(22) Filed: Apr. 19, 2016

(65) Prior Publication Data
US 2017/0022355 A1    Jan. 26, 2017

(30) Foreign Application Priority Data
Apr. 21, 2015   (EP) ..................... 15164527

(51) Int. Cl.
*C08L 61/06*     (2006.01)
*F16D 69/02*     (2006.01)

(52) U.S. Cl.
CPC ............ *C08L 61/06* (2013.01); *F16D 69/026* (2013.01); *C08L 2205/035* (2013.01); *C08L 2205/16* (2013.01); *F16D 2200/0021* (2013.01); *F16D 2200/0039* (2013.01); *F16D 2200/0065* (2013.01); *F16D 2200/0086* (2013.01)

(58) Field of Classification Search
CPC ....................................... C08L 61/06
USPC ....................................... 523/156
See application file for complete search history.

(56) References Cited

U.S. PATENT DOCUMENTS

| | | | | |
|---|---|---|---|---|
| 3,861,935 A | * | 1/1975 | Ohnemuller | C01B 33/22 106/241 |
| 4,348,490 A | | 9/1982 | Ogiwara | |
| 4,373,038 A | | 2/1983 | Moraw et al. | |
| 6,481,555 B1 | | 11/2002 | Hell et al. | |
| 2002/0098324 A1 | | 7/2002 | Mizuno et al. | |
| 2002/0132877 A1 | * | 9/2002 | Saikatsu | F16D 69/026 523/152 |
| 2003/0064217 A1 | * | 4/2003 | Tsugawa | F16D 69/026 428/328 |
| 2007/0082974 A1 | * | 4/2007 | Ogiwara et al. | B22F 1/0559 523/149 |
| 2010/0331447 A1 | | 12/2010 | Schoo et al. | |
| 2013/0158162 A1 | | 6/2013 | Hatano et al. | |

FOREIGN PATENT DOCUMENTS

| | | |
|---|---|---|
| CN | 101613516 | 12/2009 |
| JP | 2009-132816 | * 6/2009 |
| JP | 2009132816 | 6/2009 |
| JP | 2010-285558 | * 12/2010 |

OTHER PUBLICATIONS

Machine translation of JP 2010-285558 (Year: 2010).*
Machine translation of JP 2009-132816 (Year: 2009).*
Derwent Abstract of JP 2009-132816 (Year: 2009).*
Search Report dated 2015.

* cited by examiner

*Primary Examiner* — Doris L Lee
(74) *Attorney, Agent, or Firm* — IPSILON USA, LLP

(57) ABSTRACT

A composition is provided having at least one binder, and a fiber substrate. The fiber substrate has organic fibers and metallic fibers, the amount of metallic fibers being superior or equal to the amount of organic fibers. The composition further has at least one oxide compound (A) selected among at least one silicate compound (A1), at least one phosphate compound (A2), and any mixture thereof.

23 Claims, No Drawings

COMPOSITION FOR FRICTION MATERIAL

RELATED APPLICATIONS

This application claims the benefit of priority from European Patent Application No. 15 164 527.2, filed on Apr. 21, 2015, the entirety of which is incorporated by reference.

BACKGROUND

Field of the Invention

The present invention relates to a composition for friction material, a friction material obtained from said composition, and a process of manufacturing said friction material.

More particularly, the composition is used to manufacture a friction material in an automobile brake, such as in a disc brake pad and/or in a brake lining used to brake a car and the like.

Description of Related Art

Friction materials in the automobile brake are well-known in the art and are complex materials. They tend to be more and more environmentally friendly in lowering more particularly the content of copper, while keeping a good abrasion resistance at high temperature.

In this respect, the document US 2014/0202805 describes a non-asbestos composition for friction material comprising a binder, an organic filler, an inorganic filler, and a fiber substrate, containing at most 5% by weight of copper, 0.5 to 12% by weight of antimony trisulfide, and 10 to 35% by weight of titanate salt.

However, there is a growing need to develop new environmentally friendly compositions, more particularly for friction materials, with high friction performances.

OBJECTS AND SUMMARY

To this end, an object of the present invention is a composition comprising at least one binder, and a fiber substrate, characterized in that:
  the fiber substrate comprises organic fibers and metallic fibers, the amount of metallic fibers being superior or equal to the amount of organic fibers, and
  the composition further comprises at least one oxide compound (A) selected among at least one silicate compound (A1), at least one phosphate compound (A2), and any mixture thereof.

The present invention advantageously provides a composition used for the preparation of a friction material in an automobile brake, improving the friction performance and being environmentally friendly, while being easy to process and to manufacture.

In this respect, the friction material obtained from the composition of the invention surprisingly presents high friction performances with a least one or both of the two following characteristics, according to the AK-Master standard:
  a µ first fading superior or equal to 0.30, and more preferably superior or equal to 0.32, and even more preferable superior or equal to 0.34, and/or
  a pad wear inferior or equal to 0.40 mm, and more preferably inferior or equal to 0.35 mm, and even more preferable inferior or equal to 0.30 mm.

The AK-Master standard, or the dynamometer program AK-Master, is well-known in the art and is related to the friction value behavior of a friction material with regard to the influence of pressure, temperature and speed.

DETAILED DESCRIPTION

In the present description, a range delimited from the value "x" to the value "y" mean that the limits "x" and "y" are included in this range.

The Binder(s)

The composition of the invention comprises one or several binders.

The binder aims at bonding integrally the compounds constituting the composition, once the composition forms a friction material. In other terms, the binder serves as a matrix that holds the other compounds together in the friction material.

Hence, the binder(s) in the composition is/are intended to be cured to form a friction material, more particularly by heating to a sufficient temperature to cure (i.e. cross-link) the binder.

The binder can be any binder well-known in the art and can be more particularly a thermosetting resin, such as for example a phenolic resin, modified or not. These types of binders can have a cross-linking temperature from 100° C. to 200° C.

As modified phenolic resin, one can cite acrylic elastomer-dispersed phenolic resin, silicone elastomer-dispersed phenolic resin, acryl-modified phenolic resin, silicone-modified phenolic resin, cashew-modified phenolic resin, epoxy-modified phenolic resin, alkylbenzene-modified phenolic resin, nitrile-modified phenolic resin.

By way of example, the binder can be a phenolic-formaldehyde resin well-known as Novolac resins, or a base-catalysed phenolic-formaldehyde resin well-known as Resole resins.

The binder can be combined with at least one element selected among one cross-linking agent, one hardener, one catalyst, and any mixture thereof; the cross-linking agent, the hardener and the catalyst being well-known in the art.

By way of example, the Novolac resin can be associated with hexamethylenetetramine as hardener.

The amount of binder(s) in the composition can be adjusted to obtain the desired properties.

For example, the composition can comprise from 10 to 30% by volume of binder(s), and more preferable from 10 to 20% by volume of binder(s), over the total volume of the composition.

The Fiber Structure

The composition of the invention comprises a fiber substrate. The fiber substrate aims at mechanically reinforcing the frictional material.

The fiber substrate comprises fibers, which can be of various types with various lengths, used to control performance characteristics of the friction material.

The fibers can be synthetic or natural in origin, and pure or recycled in form.

The composition advantageously comprises organic fibers and metallic fibers, or in other terms the fiber substrate comprises organic fibers and metallic fibers.

The organic fibers can be selected among aramid fibers, cellulose fibers, acryl fibers, wood fibers, polypropylene fibers, and any mixture thereof.

More preferably, the organic fibers can be a mixture of three types of organic fibers, such as for example a mixture of wood fibers, polypropylene fibers and aramid fibers.

The amount of wood fibers, polypropylene fibers and aramid fibers can be from 20 to 60% by volume of wood fibers, from 30 to 70% by volume of polypropylene fibers, and from 1 to 20% by volume of aramid fibers, over the total volume of organic fibers.

Typically, the wood fibers can have an average length less than 150 µm for around 80-95% of the fibers; the polypropylene fibers can have an average length less than 3.3 mm for around 90-100% of the fibers; and the aramid fibers can have an average length of from 0.6 to 1.2 mm for around 90-100% of the fibers.

The metallic fibers can be any fibers made from a metal or a metal alloy, the metal being more particularly selected among aluminum, iron, zinc, tin, titanium, nickel, magnesium, silicon, and any mixture thereof. The metal used in said metallic fibers has preferably a degree of oxidation equal to 0.

The preferred metallic fibers used in the composition are steel fibers (i.e. alloys of iron and carbon) and/or steel alloy fibers. The steel fibers or steel alloy fibers can typically have an average length less than 125 µm for around 45-60% of the fibers.

The average fiber length referred to herein means the number-average fiber length showing the average value of length of the entire fibers pertinent thereto. An average fiber length of x mm means that the average value is x mm when the fiber lengths of randomly selected 50 fibers used as the raw material for the composition are measured with an optical microscope.

In a particular embodiment, the metallic fibers are not copper fibers or copper alloy fibers.

The composition can further comprise other types of fibers well-known in the art, which are different from organic fibers and metallic fibers, such as for example inorganic fibers and/or carbon fibers.

In a preferred embodiment, the composition of the invention can only include organic fibers and metallic fibers.

The amount of the fiber substrate in the composition can be adjusted to obtain the desired properties.

For example, the composition of the present invention can comprise from 5 to 40% by volume of the fiber substrate, and more preferably less than 30% by volume of the fiber substrate, and even more preferably from 12 to 26% by volume of the fiber substrate, over the total volume of the composition.

In a particular embodiment, the composition can comprise from 5 to 40% by volume of the organic and metallic fibers, and more preferably less than 30% by volume of the organic and metallic fibers, and even more preferably from 12 to 26% by volume of the organic and metallic fibers, over the total volume of the composition.

In a preferred embodiment, the composition can comprise at least 10% by volume of metallic fibers, and more preferably at least 12% by volume of metallic fibers, over the total volume of the composition.

In another preferred embodiment, the composition can comprise at most 20% by volume of metallic fibers, and more preferably at most 15% by volume of metallic fibers, over the total volume of the composition.

The composition of the present invention is preferably used to manufacture a "low-steel" friction material, with an amount of steel fibers inferior or equal to 20% by volume over the total volume of the composition.

The Oxide Compound(s) (A)

The composition of the invention comprises one or several oxide compound(s) (A) selected among at least one silicate compound (A1), at least one phosphate compound (A2), and any mixture thereof.

Said oxide compounds (A) can be considered as fillers in the composition of the invention.

Said oxide compounds (A) are typically chemical compounds that contain at least one oxygen atom and one or several other elements different from the oxygen atom.

More preferably the other element can be at least one alkaline earth metal and/or at least one metal, or in other terms, the oxide compound (A) can comprise at least one alkaline earth metal element and/or at least one metal element.

The alkaline earth metal element can be for example calcium. The metal element can be for example zinc.

The silicate compound comprises at least one anionic silicon compound, and can be selected among calcium silicates and any mixture thereof.

In a particular embodiment, the calcium silicate used in the present composition can be selected among $Ca_2SiO_4$ (dicalcium silicate), $Ca_3SiO_5$, $Ca_6Si_6O_{17}(OH)_2$ (xonolithe), and any mixture thereof. Xonolithe is the preferred silicate compound (A1) used in the composition of the invention.

In a particular embodiment, synthetic calcium compounds are preferred since they present better stability than natural calcium compounds.

The phosphate compound comprises at least one anionic phosphate or organophosphate compound, and can be selected among calcium phosphates, zinc phosphates, and any mixture thereof.

In a particular embodiment, the phosphate compound used in the present composition can be selected among $Ca_2P_2O_7$ (calcium Pyrophosphate), $Ca(H_2PO_4)_2$, $CaHPO_4$, $Ca_5(PO_4)_3(OH)$, $Zn_3(PO_4)_2$, $Zn_3(PO_4).4H_2O$, $Zn_2(PO_4)(OH)$, and any mixture thereof.

In a first variant, the composition can comprise at least one oxide compound (A) as defined above, and more preferably at least one silicate compound (A1) or at least one phosphate compound (A2).

In a second variant, the composition can comprise at least two oxide compounds (A) as defined above, and more preferably at least one silicate compound (A1) and at least one phosphate compound (A2). More particularly, the amount of the silicate compound(s) (A1) can advantageously be inferior or equal to the amount of the phosphate compound(s) (A2).

In the present invention, the amount of the oxide compound(s) (A) in the composition can be adjusted to obtain the desired properties.

By way of example, the composition can comprise less than 18% by volume of said oxide compound(s) (A), more preferably from 0.5 to 15% by volume of said oxide compound(s) (A), and even more preferably from 1 to 10% by volume of said oxide compound(s) (A), over the total volume of the composition.

When the composition comprises at least one silicate compound (A1), the composition can comprise from 0.5 to 6% by volume of said silicate compound(s), and more preferably from 1 to 4% by volume of said silicate compound(s), over the total volume of the composition.

When the composition comprises at least one phosphate compound (A2), the composition can comprise from 0.5 to 10% by volume of said phosphate compound(s), and more preferably from 1 to 8% by volume of said phosphate compound(s), over the total volume of the composition.

Other Compound(s) in the Composition

The composition of the invention can further comprise at least one compound selected among an abrasive, a lubricant, a carbon substrate, and any mixture thereof.

All these compounds are preferably different from the oxide compound(s) (A) as defined in the present description.

The Abrasive(s)

The composition of the invention can include one or several abrasive(s). Abrasives are typically classified by their Mohs hardness. The hard abrasives (i.e. those with higher values on the Mohs hardness scale) may be used in low concentrations, while the mild abrasives (i.e. those with lower values on the Mohs hardness scale) may be used in higher concentrations to achieve the same desired friction level.

Examples of abrasives can comprise mineral fibers, zirconia, alumina, magnesium oxide (i.e. magnesia), zirconium silicate, silica, silicon dioxide, sand, silicon carbide, mullite, iron oxide, tin oxide, complex mineral silicates such as calcium magnesium silicate, calcium magnesium zirconium silicate, calcium magnesium aluminum silicate, magnesium aluminum silicate, iron chromium oxide (i.e. chromite), synthetic mineral fibers such as hardwool, slagwool and rockwool, and several naturally occurring minerals.

The preferred abrasives used in the composition can be selected among tin oxide ($SnO_2$), iron chromium oxide ($FeCr_2O_4$), magnesium oxide (MgO), and any mixture thereof.

The amount of said abrasive(s) in the composition can be adjusted to obtain the desired properties.

For example, the composition can comprise from 5 to 30% by volume of abrasive(s), and more preferably from 8 to 20% by volume of abrasive(s), and even more preferably less than 15% by volume of abrasive(s), over the total volume of the composition.

The Lubricant(s)

The composition of the invention can include one or several lubricant(s). Lubricants aim at reducing the pad and disc wear during service.

Examples of lubricants can comprise metal sulfides, organic lubricants, metal lubricants or a combination thereof. Examples of metal sulfides include, but are not limited to, tin sulfides, antimony trisulfide, antimony trioxide, zinc sulfide, and iron sulfide. An example of an organic lubricant is phthalocyanine and examples of metal lubricants include tin and zinc powders. Metal sulfides include metal sulfide complexes such as those having tin sulfide as one of the main ingredients.

The composition can also comprise zinc powder as lubricant. The average particle diameter (D50) of the zinc powder can be preferably in the range of 0.1 to 150 µm, and more preferably in the range of 0.1 to 100 µm, and even more preferably in the range of 1 to 50 µm, or especially preferably in the range of 2 to 5 µm.

The preferred lubricants used in the composition can be selected among tin sulfide, zinc powder, and any mixture thereof.

The amount of said lubricant(s) in the composition can be adjusted to obtain the desired properties.

For example, the composition can comprise from 2 to 10% by volume of lubricant(s), and more preferably from 3 to 8% by volume of lubricant (s), over the total volume of the composition.

When the composition comprises zinc powder, the composition can comprise up to 2% by volume of zinc powder, and more preferably up to 1% by volume of zinc powder, over the total volume of the composition.

The Carbon Substrate

The carbon substrate allows to form the balance of the composition. The carbon substrate can be selected among graphite, petroleum coke, desulfurized coke, and any mixture thereof.

The amount of said carbon substrate in the composition can be adjusted to obtain the desired properties.

For example, the composition can comprise from 10 to 40% by volume of carbon substrate, and more preferably from 20 to 30% by volume of carbon substrate, over the total volume of the composition.

The composition of the invention can further comprise one or several further filler(s), said further fillers being different from the oxide compound(s) (A) as defined in the present description. Said further fillers allow to form the balance of the composition.

Examples of further fillers can comprise lime, calcium oxide, barium sulfate, rubber including various powder rubbers and recycled rubber and friction dust including brown, black, straight, modified or other grades of friction dust.

The preferred further fillers used in the composition can be barium sulfate ($BaSO_4$).

The amount of said further filler(s) in the composition can be adjusted to obtain the desired properties.

For example, the composition can comprise from 5 to 50% by volume of said further filler(s), and more preferably from 10 to 20% by volume of said further filler(s), over the total volume of the composition.

The composition of the invention can be advantageously environmentally friendly.

The composition, and more preferably the friction material, can be substantially free of at least one compound selected among titanate salt, asbestos, antimony trisulfide, antimony trioxide, copper, copper alloy, and any mixture thereof.

In a particular embodiment, the composition, and more preferably the friction material, can be substantially free of copper and titanate salt.

More preferably, the composition, and more preferably the friction material, can be substantially free of at least one compound selected among titanate-based compounds, asbestos-based compounds, antimony-based compounds, copper-based compounds, and any mixture thereof.

By the expression "substantially free", one means an amount less than 5% by volume (limit not included) of at least one of these compounds, and more preferably less than 0.5% by volume (limit not included) of at least one of these compounds, and even more preferably 0% by volume of at least one of these compounds, over the total volume of the composition.

More preferably, the composition, and more preferably the friction material, does not include titanate salt, asbestos, antimony trisulfide, antimony trioxide, copper and copper alloy.

Friction Material

The composition of the present invention can be used to manufacture a friction material in an automobile brake.

Hence, another object of the invention is a friction material obtained from a composition according to the present invention.

More particularly, the friction material is obtained in curing the binder of the composition.

The friction material can advantageously have a porosity from 25.0 to 35.0%.

In the present invention, the porosity of the friction material can be easily determined by the mercury intrusion porosimetry method well-known in the art, in using a mercury penetrometer. The mercury porosimetry analysis is the progressive intrusion of mercury into a porous structure under stringently controlled pressures. From the pressure versus intrusion data, the volume and size distributions, using the Washburn equation, are generated.

In a more particular embodiment, the friction material of the present invention can finally comprise all the compounds and amounts as defined in the composition of the present invention, except the binder(s) since the latter is structurally modified due to a curing step to form the friction material.

Another object of the invention is an automobile brake comprising a friction material according to the present invention.

The automobile brake can comprise a disc brake pad and/or a brake lining used to brake a car and the like.

The friction material can be fixed directly to a backing plate (i.e. back plate) or fixed indirectly to a backing plate by the intermediate of an underlayer material, these designs being well known in the art.

The underlayer material can be a classical composition intends to be used as friction material, well-known in the art. More particularly, the underlayer material is a curable underlayer material including a binder.

Process

Another object of the invention is a method for manufacturing a friction material according to the invention, comprising the following steps:

i. mixing the compounds of the composition,
ii. pressing the mixed composition of step i, and
iii. curing the pressed composition of step ii, to obtain the friction material.

This method is an easy and convenient method to make a friction material.

The step i can be a dry mixing step, which allows to blend the compounds into a homogeneous mixture.

The step ii allows to press the mixed composition in using a press, in order to form a compact composition. The press can be a mold, so that said step can be as well a molding step. Said mold can be a hot mold allowing to at least partially cure the mixed composition. The temperature into the press can be the cross-linking temperature of the binder.

The usual pressure in step ii can be range from 0.5 to 5 kN/cm$^2$.

After placing the mixed composition in the press, a backing plate is positioned on one side of the mixed composition, optionally separated by an underlayer material (i.e. said underlayer material physically separates the mixed composition from the backing plate).

The curing step iii can occur in an oven, after the pressing step, to obtain a cured friction material.

Before curing in an oven, the mixed composition can start to cure in a hot mold, which can be the same as the one used in step ii. In this case, the curing step can be done in two steps, with a first step in a hot mold or hot press, following by a second step in an oven.

The curing temperature as well as the curing time can be sufficient to cure the binder included in the composition of the invention, in order to obtain the friction material.

By way of example, the curing temperature can be ranged from 100° C. to 300° C., and more preferably from 150° C. to 250° C. The curing time can be ranged from 10 minutes to 5 hours.

More particularly, when the curing step iii is done in two steps, the second step in an oven can be done at a temperature which is of from 80 to 120° C. more than the cross-linking temperature of the binder.

When only a backing plate is used, the step iii also allows to bond the cured friction material to the backing plate to form the final brake pad.

When an underlayer material is used with a backing plate, the step iii also allows to bond the cured friction material to the cured underlayer material, and also to bond the cured underlayer material to the backing plate, in order to form the final brake pad.

The present invention will become more fully understood from the examples given herein below, which are given by way of illustration only, and thus which are not limits of the present invention.

1. Compositions for Friction Material

Compositions according to the present invention (Compositions I1 to I7) as well as comparative compositions (Compositions C1 to C3) have been prepared and are gathered respectively in the tables 1a and 1b, as below.

The amounts in tables 1a and 1b are expressed in percentage (%) by volume in the compositions.

TABLE 1a

|  | I1 | I2 | I3 | I4 | I5 | I6 | I7 |
| --- | --- | --- | --- | --- | --- | --- | --- |
| Binder-based compound | 15 | 15 | 15 | 15 | 15 | 15 | 15 |
| Organic fibers | 10 | 10 | 10 | 10 | 10 | 10 | 10 |
| Metallic fibers | 12 | 12 | 12 | 12 | 12 | 12 | 12 |
| Abrasive 1 | 3 | 3 | 3 | 3 | 3 | 3 | 3 |
| Abrasive 2 | 3 | 3 | 3 | 3 | 3 | 3 | 3 |
| Abrasive 3 | 6 | 6 | 6 | 6 | 6 | 6 | 6 |
| Lubricant 1 | 5 | 5 | 5 | 5 | 5 | 5 | 5 |
| Lubricant 2 | 0.5 | 0.5 | 0.5 | 0.5 | 0.5 | 0.5 | 0.5 |
| Carbon substrate | 24 | 23 | 21 | 27 | 20 | 25 | 28 |
| Filler A1 | 1 | 2 | 4 | 2 | 2 | 0 | 2 |
| Filler A2 | 5 | 5 | 5 | 1 | 8 | 5 | 0 |
| Filler B | 15.5 | 15.5 | 15.5 | 15.5 | 15.5 | 15.5 | 15.5 |
| Total volume | 100 | 100 | 100 | 100 | 100 | 100 | 100 |

TABLE 1b

|  | C1 | C2 | C3 |
| --- | --- | --- | --- |
| Binder-based compound | 15 | 15 | 15 |
| Organic fibers | 10 | 10 | 18 |
| Metallic fibers | 8 | 12 | 12 |
| Abrasive 1 | 3 | 3 | 3 |
| Abrasive 2 | 3 | 3 | 3 |
| Abrasive 3 | 6 | 6 | 6 |
| Lubricant 1 | 5 | 5 | 5 |
| Lubricant 2 | 0.5 | 0.5 | 0.5 |
| Carbon substrate | 27 | 28 | 19.5 |
| Filler A1 | 2 | 0 | 8 |
| Filler A2 | 5 | 0 | 10 |
| Filler B | 15.5 | 17.5 | 0 |
| Total volume | 100 | 100 | 100 |

The different compounds listed in tables 1a and 1b are as follows:

Binder-based compound is a phenolic-formaldehyde resin-based compound, having a cross-linking temperature of 150° C., commercialized by Fers Resins SA under the reference FB8027; this compound comprises at least 85% by weight of phenolic-formaldehyde resin over the total weight of the binder-based compound, and also comprises hexamethylenetetramine as hardener;

Organic fibers are a mixture of 40% by volume of wood fibers, 50% by volume of polypropylene fibers and 10% by volume of aramid fibers, over the total volume of the organic fibers;

Metallic fibers are steel fibers;

Abrasive 1 is tin oxide ($SnO_2$);

Abrasive 2 is chromite ($FeCr_2O_4$);

Abrasive 3 is magnesium oxide (MgO);

Lubricant 1 is tin sulfide (SnS);

Lubricant 2 is zinc powder with an average particle diameter of 3-4 μm (D50);

Carbon substrate is graphite;

Filler A1 is synthetic xonolithe ($Ca_6Si_6O_{17}(OH)_2$) commercialized by Lapinus Fibers, under the reference Promaxon;

Filler A2 is calcium pyrophosphate ($Ca_2P_2O_7$) commercialized by Taihei Yogyo Yaguhin Co. Ltd, under the reference Calcium pyrophosphate; and Filler B is barium sulfate ($BaSO_4$).

2. Preparation of the Friction Materials

The preparation for each composition I1 to I7 and C1 to C3 is identical and is as follows.

The compounds are dry-blended together in a standard tumble mixer for approximately 4 minutes.

The obtained mixture is placed into a hot press as mold, and a backing plate is positioned on one side of the mixture. A classical underlayer material is further positioned between the mixture and the backing plate.

Then, the obtained mixture, together with the underlayer material and the backing plate, is pressed at 2 kN/cm² and heated at 150° C. during around 4 minutes.

Finally, the pressed material is placed into an oven at a temperature of 250° C. between 1 and 2 hours, in order to obtain a cured mixture as friction material.

The association of the cured friction material together with the cured underlayer material and the backing plate form a pad.

3. Friction Performance Test and Results

The friction performances of the friction materials obtained from the compositions in tables 1a and 1b, are evaluated according to the AK-Master standard, and comprise the following characteristics:

μ (80 km/h): The initial temperature is set up at 100° C. The initial speed is set up at 80 km/h and the final speed at 40 km/h. For each pressure 10, 20, 30, 40, 50, 60, 70 and 80 bar, one breaking application is performed. μ (80 km/h) is the average value of the 8 friction coefficients measured for each breaking.

μ average: The initial temperature is set up at 100° C. The initial speed is set up at 80 km/h, the final speed at 30 km/h, and the pressure at 30 bar. Six breaking applications are performed. μ average is the average value of the six friction coefficients measured for each breaking.

μ first fading (min): 15 breakings are performed. The initial temperatures are set up as follows: 100° C., 215° C., 283° C., 333° C., 367° C., 398° C., 423° C., 446° C., 465° C., 483° C., 498° C., 513° C., 526° C., 539° C. and 550° C. The initial speed is set up at 100 km/h, the final speed below 5 km/h, the deceleration at 0.4 g and the max pressure is 160 bar. 15 breaking applications are performed. μ 1st fading is the minimum value of all the μ first fading friction coefficients.

μ second fading (min): 15 breakings are performed. The initial temperatures are set up as follows: 100° C., 215° C., 283° C., 333° C., 367° C., 398° C., 423° C., 446° C., 465° C., 483° C., 498° C., 513° C., 526° C., 539° C. and 550° C. The initial speed is set up at 100 km/h, the final speed below 5 km/h, the deceleration at 0.4 g and the max pressure is 160 bar. 15 breaking applications are performed. μ 2nd fading is the minimum value of all the μ second fading friction coefficients. The second fading is a replicate of the first fading (the same sequence is run later in the AK-Master test).

rotor wear (g): The weight of the rotor is measured before and after test to check the loss in weight during the full test.

pad wear (mm): The thicknesses of the pads are measured before and after test to check the pad wear during the full test.

In addition to the friction performances, the porosity (%) of the friction materials is determined as described in the present invention.

The friction performance test and porosity results of the friction materials are gathered in the following tables 2a and 2b.

TABLE 2a

|  | I1 | I2 | I3 | I4 | I5 | I6 | I7 |
|---|---|---|---|---|---|---|---|
| μ (80 km/h) | 0.44 | 0.45 | 0.45 | 0.41 | 0.46 | 0.44 | 0.40 |
| μ average | 0.47 | 0.48 | 0.48 | 0.44 | 0.49 | 0.46 | 0.42 |
| μ first fading (min) | 0.36 | 0.38 | 0.37 | 0.32 | 0.37 | 0.34 | 0.30 |
| μ second fading (min) | 0.39 | 0.39 | 0.39 | 0.38 | 0.40 | 0.38 | 0.36 |
| rotor wear (g) | 18 | 20 | 21 | 14 | 25 | 16 | 12 |
| pad wear (mm) | 0.27 | 0.27 | 0.30 | 0.22 | 0.35 | 0.26 | 0.20 |
| Porosity (%) | 29.0 | 29.5 | 30.5 | 27.0 | 32.0 | 28.7 | 26.6 |

TABLE 2b

|  | C1 | C2 | C3 |
|---|---|---|---|
| μ (80 km/h) | 0.43 | 0.40 | 0.47 |
| μ average | 0.46 | 0.41 | 0.48 |
| μ first fading (min) | 0.35 | 0.28 | 0.37 |
| μ second fading (min) | 0.38 | 0.34 | 0.36 |
| rotor wear (g) | 17 | 11 | 23 |
| pad wear (mm) | 0.44 | 0.17 | 0.63 |
| Porosity (%) | 30.0 | 24.7 | 35.2 |

In view of the results in tables 2a and 2b, the friction materials according to the invention, obtained from the compositions of table 1a (compositions I1 to I7), surprisingly present high friction performances, according to the AK-Master standard, including:

a μ first fading (min) superior or equal to 0.30, a pad wear inferior or equal to 0.35 mm, and a porosity comprised between 25.0 to 35.0%.

The invention claimed is:

1. A composition for friction material, comprising:
at least one binder; and
a fiber substrate;
wherein the fiber substrate has organic fibers and metallic fibers, the amount of metallic fibers being superior or equal to the amount of organic fibers, and wherein the composition further has oxide compounds, the oxide compounds being at least one silicate compound and at least one phosphate compound, and wherein the composition comprises less than 0.5% by volume of copper-based compounds, over the total volume of the composition, and wherein the friction material has a porosity from greater than 25.0% up to 35.0%.

2. The composition according to claim 1, wherein the silicate compound is xonolithe ($Ca_6Si_6O_{17}(OH)_2$).

3. The composition according to claim 1, wherein the phosphate compound is calcium pyrophosphate ($Ca_2P_2O_7$).

4. The composition according to claim 1, wherein the amount of the silicate compound(s) is inferior or equal to the amount of the phosphate compound(s).

5. The composition according to claim 1, wherein the composition has less than 18% by volume of the oxide compounds, over the total volume of the composition.

6. The composition according to claim 1, wherein the composition has from 12 to 26% by volume of the organic and metallic fibers, over the total volume of the composition.

7. The composition according to claim 1, wherein the composition further comprises at least one compound selected among the group consisting of an abrasive, a lubricant, a carbon substrate, and any mixture thereof.

8. The composition according to claim 1, wherein the composition is substantially free of antimony-based compounds.

9. The composition according to claim 1, wherein the composition is substantially free of titanate salt.

10. The composition according to claim 1, wherein the metallic fibers are steel fibers.

11. The composition according to claim 1, wherein the metallic fibers are not copper fibers or copper alloy fibers.

12. The composition according to claim 1, wherein the oxide compounds have at least one alkaline earth metal element and/or at least one metal element.

13. The composition according to claim 1, wherein the composition has from 0.5 to 6% by volume of the silicate compound(s), over the total volume of the composition.

14. The composition according to claim 1, wherein the composition has from 0.5 to 10% by volume of the phosphate compound(s), over the total volume of the composition.

15. The composition according to claim 1, wherein the composition has at least 10% by volume of metallic fibers, over the total volume of the composition.

16. The composition according to claim 1, wherein the composition has at most 20% by volume of metallic fibers, over the total volume of the composition.

17. The composition according to claim 12, wherein the alkaline earth metal element is calcium.

18. The composition according to claim 13, wherein the composition has from 1 to 4% by volume of the silicate compound(s), over the total volume of the composition.

19. The composition according to claim 14, wherein the composition has from 1 to 8% by volume of the phosphate compound(s), over the total volume of the composition.

20. The composition according to claim 15, wherein the composition has at least 12% by volume of metallic fibers, over the total volume of the composition.

21. The composition according to claim 16, wherein the composition has at most 15% by volume of metallic fibers, over the total volume of the composition.

22. A method for manufacturing the friction material as claimed in claim 1, comprising the following steps:
   i. mixing the compounds of the composition;
   ii. pressing the mixed composition of step i; and
   iii. curing the pressed composition of step ii, to obtain the friction material.

23. An automobile brake comprising:
a friction material as claimed in claim 1.

* * * * *